United States Patent
Whitefield et al.

[11] Patent Number: 5,810,568
[45] Date of Patent: Sep. 22, 1998

[54] ROTARY PUMP WITH A THERMALLY CONDUCTIVE HOUSING

[75] Inventors: Kevin John Whitefield, Attleborough; Simon John Baseley, Orpington, both of United Kingdom

[73] Assignee: Temple Farm Works, Rochester, England

[21] Appl. No.: 669,366

[22] PCT Filed: Nov. 6, 1995

[86] PCT No.: PCT/GB95/02621

§ 371 Date: Sep. 19, 1996

§ 102(e) Date: Sep. 19, 1996

[87] PCT Pub. No.: WO96/14511

PCT Pub. Date: May 17, 1996

[30] Foreign Application Priority Data

Nov. 7, 1994 [GB] United Kingdom .................... 9422448
Nov. 29, 1994 [GB] United Kingdom .................... 9424053

[51] Int. Cl.⁶ .................................................. F04B 35/04
[52] U.S. Cl. ..................................... 417/423.8; 417/423.7; 417/423.14; 417/410.3
[58] Field of Search ............................. 417/423.7, 423.8, 417/423.14, 424.1, 424.7, 410.3, 410.4

[56] References Cited

U.S. PATENT DOCUMENTS

| | | | |
|---|---|---|---|
| 2,548,799 | 4/1951 | Johnson et al. | 417/410.3 |
| 2,938,468 | 5/1960 | Kececioglu et al. | |
| 4,428,719 | 1/1984 | Hayashibara et al. | 417/423.7 |
| 4,836,147 | 6/1989 | Morris | 417/423.7 |
| 5,098,256 | 3/1992 | Smith | 415/111 |
| 5,478,222 | 12/1995 | Heidelberg et al. | 417/423.7 |
| 5,588,814 | 12/1996 | De Filippis et al. | 417/423.7 |

FOREIGN PATENT DOCUMENTS

| | | |
|---|---|---|
| 481423 | 4/1992 | European Pat. Off. . |
| 699436 | 11/1953 | United Kingdom . |
| 743739 | 1/1956 | United Kingdom . |
| 92 18774 | 10/1992 | WIPO . |

*Primary Examiner*—Charles G. Freay
*Attorney, Agent, or Firm*—Michael D. Bednarek; Kilpatrick Stockton LLP

[57] ABSTRACT

A rotary pump which is suitable for use as the pump for a vehicle power steering system has an integral motor. The pump includes a housing 16 through which a rotatable shaft 4 extends having at one end a pump rotor assembly 5. The pump rotor assembly 5 is in fluid communication with an oil cavity 15 which is in good thermal contact with the housing 16. The housing 16 functions as a heat sink. Mounted on the radially outer wall of the housing 16 is the stator 20 of the motor with the stator 20 also in good thermal contact with the housing 16. The rotor 26 of the motor is located radially outside of the stator 20 and has axially arranged magnets 27. The rotor 26 is connected to the rotatable shaft 4 by means of a radially extending wall 26b. The integral rotary pump and motor is very compact and straightforward to construct and is also capable of withstanding the heat generated by the motor components during the high demands of a vehicle steering system.

15 Claims, 5 Drawing Sheets

ROTARY PUMP WITH A THERMALLY CONDUCTIVE HOUSING

The present invention relates to a rotary pump and particularly to an electrically driven rotary pump. The present invention is suitable as a pump for vehicle power steering but not exclusively so.

Pumps used in power assisted steering of vehicles are usually driven mechanically directly from the engine. More recently though electric motor driven pumps have started to be used on vehicles, since they save engine power and fuel and are easier to package in the engine bay. Conventionally these motors are of the brushed d.c. type, and need to be powerful enough to satisfy demands for high power at low vehicle speeds and parking. These high power demands, e.g. up to 1 kilowatt account for only approximately 5% of the operational time of the motor and are short lived, that is the demand is not expected to last more than ten seconds, for example. Significantly lower power, e.g. 30 to 100 watts, is required for approximately 95% of its operational time. Brushless d.c. motors provide better control and can automatically limit in-rush current, unlike conventional motors with brushes. In addition, brushes have poor performance at very high power and will eventually wear out. Therefore, unlike brushed motors, it is possible to over power a brushless motor for brief periods for a given motor size. Conventional brushed and brushless motors consist of a rotating inner wound stator and stationary outer magnets.

The electrical motors used to drive power assisted steering pumps are commonly mounted adjacent to the pump and require separate assembly and testing. Moreover, difficulties have been experienced as a result of the very high temperatures which are generated by the motor especially when the higher power demands of low speed steering occur. One solution to this has been to completely surround the stator of the motor in oil in order to reduce the temperature of the exterior casing of the motor thereby enabling it to be used safely under the bonnet of the vehicle and preventing failure of its components due to the very high temperatures generated. This has the disadvantage though of significantly reducing the efficiency of the motor.

It is also the case not only for the above reason but also because of the physical limitation on the size of the motor to enable it to be mounted under the vehicle bonnet, that the rotor magnet conventionally consists of a rare earth to meet the power demands of the system which significantly increases the cost of the component.

The present invention seeks to overcome at least partly the difficulties identified above with respect to conventional motors for power steering pumps. In this respect the present invention seeks to provide an integral pump and motor which is compact and yet capable of meeting the power demands of a vehicle steering system and which reduces the problems associated with the high temperatures involved in a simple yet cost effective manner.

The present invention provides in a first aspect a rotary pump assembly having at least one inlet port, at least one outlet port, a housing and a pumping device in fluid communication with the inlet and outlet ports, the pumping device including a pump driver member mounted on a rotatable shaft which is connected to the rotor of an electric motor, a portion of the housing being located radially between the shaft and the rotor of the motor and having the stator of the motor mounted thereon.

The fluid pump includes a cavity in communication with the inlet port which may be located about the rotatable shaft.

With the "inside-out" construction described above, that is a stationary inner wound stator and rotating magnets, more power can be gained for a given physical size of motor. For reasons of cost and size it is preferred that a lower rated motor is employed which is capable of accommodating the brief demands for high power. With the present invention which utilises the "inside-out" construction of a brushless d.c. motor as described, it is possible to employ a lower rated motor than has formerly been the case. Ideally means of conducting away from sensitive components the heat which is generated by such a motor at high power levels is also provided.

In a preferred embodiment the housing is a heat sink and is in thermal contact with the copper wound stator of the electric motor. Also the housing in the form of the heat sink may define at least partially the boundary of the cavity connecting a fluid reservoir to the at least one pump inlet.

In an additional preferred embodiment the circuitry for controlling the electric motor may be mounted on the pump housing radially between the shaft and the rotor. Ideally the housing is a heat sink and at least some of the circuitry may be in thermal contact with the heat sink.

Preferably the rotary pump is integral with the electric motor.

The present invention will now be described by way of example only with reference to the accompanying drawings, in which.

Figure 1:
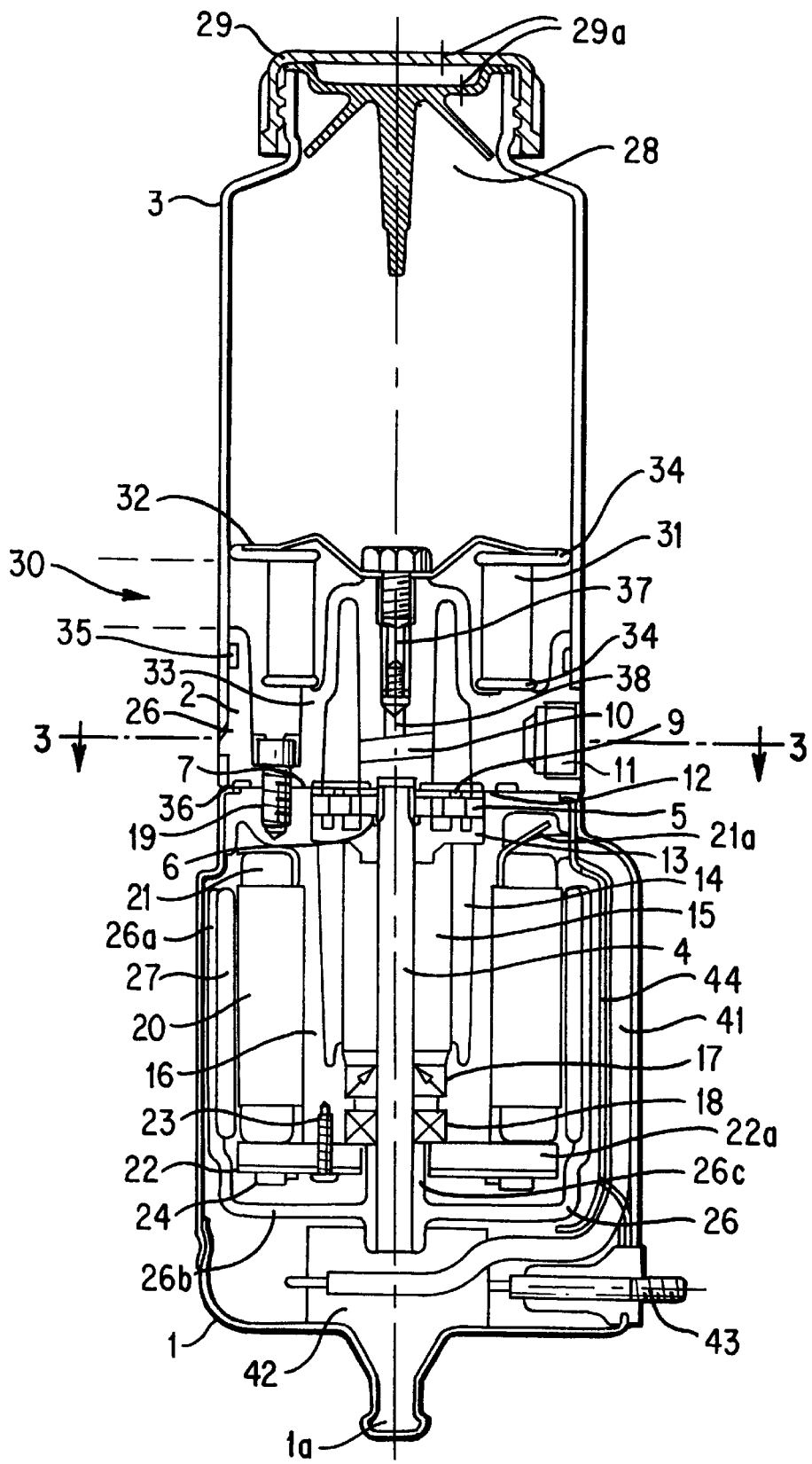
FIG. 1 is a first axial sectional view through an integral rotary pump and motor in accordance with a first embodiment of the present invention.

A rotary pump and its associated motor is shown in FIG. 1 and is suitable for use as the pump for a power steering system in a vehicle. The rotary pump and integral motor may be mounted either directly on the steering rack or gear box of a vehicle or on the chassis near to the steering rack or on the engine. Indeed, the rotary pump and motor may be mounted anywhere on the vehicle but preferably in the engine bay near to the steering rack. It is preferred that the rotary pump/motor is near to the steering system so as to minimise any delay in response to a demand for power from the steering system and near to the battery to minimise electrical losses. The rotary pump is secured by its casing 1 to its mounting point on the vehicle by means of a locating point at its base 1$a$ and two further locating points 2$a$ on a cover member 2. Each of the locating points may include rubber bushings to limit vibration and noise transmission.

Figure 3:
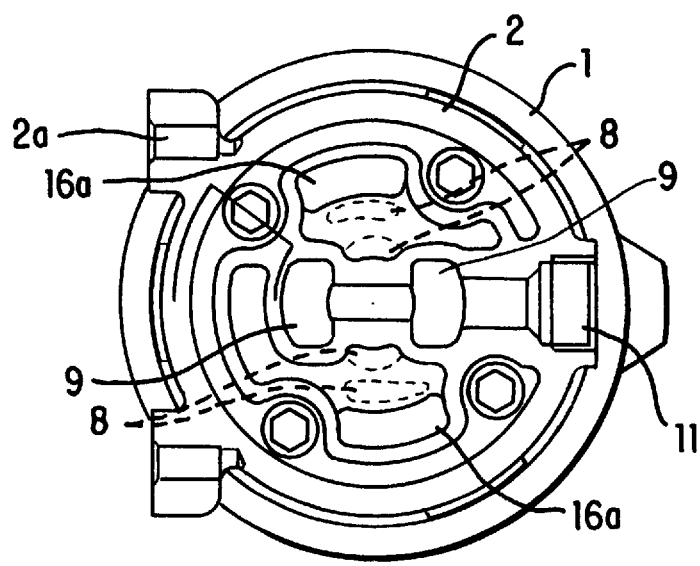
FIG. 3 is a radial sectional view along the line A—A in FIG. 1.

The rotary pump and motor includes a casing 1 within which is located a pump housing 16. A cover member 2 and an oil reservoir 3 are secured to the pump housing 16. A rotatable shaft 4 is located axially within the casing 1 and the pump housing 16 and has at one end a pump rotor assembly 5 connected to it. The elements of the pump may correspond to those of the rotary pump described in U.S. Pat. No. 4,659,296, the contents of which are incorporated herein by reference although with this embodiment two inlet ports are provided. The pump rotor 5 is connected to the shaft 4 by means of spline elements 6 which may be flats, hexagon, key or any other conventional arrangement. To one side of the pump rotor 5 a port plate 7 is provided which defines the low and high pressure ports into and out of the pump rotor. There are two low pressure ports 8 and two high pressure ports 9 which are shown more clearly in FIG. 3. The high pressure ports 9 are in communication with a discharge conduit 10 which is provided in the cover member 2 and which leads to a discharge port 11. The discharge port 11 may be threaded to enable connection to the steering system (not shown). A seal 12 is also provided around each of the high pressure ports 9. To ensure accurate positioning of the seals 12, the seals 12 may be formed in a single unit and angularly located to the face of the port plate 7 by means of a pin (not shown).

On the opposing side of the pump rotor 5 an end plate 13 is provided which locates in a machine recess in the pump housing 16. Fins 14 define the boundary wall of an oil cavity 15 located about the shaft 4 with the end plate 13 providing inlet ports to the pump rotor from the cavity 15. The fins 14 ensure heat transfer to the oil within the cavity 15 from the pump housing 16 which also functions as a heat sink. The end plate 13 therefore defines one end of the oil cavity 15, the other end of the cavity 15, distant from the end plate 13, being closed by an oil seal member 17. Oil is supplied to the cavity 15 by means of an inlet gallery 16a, more clearly seen in FIG. 2. Adjacent the oil seal member 17 a bearing 18 is provided which may be conventional in design and which supports the shaft 4 in position with respect to the heat sink 16 and enables relative rotation of the shaft 4. The shaft 4 rotates hydrodynamically in the bore of the end plate 13.

The pump housing 16 encircles the pump rotor 5, end plate 13, and oil cavity 15 and, as mentioned above, functions as a heat sink. The heat sink 16 may be made of any suitable thermally massive material, for example aluminium. The heat sink 16 is secured to the cover member 2 by means of one or more bolts 19, for example four, or other suitable securing devices. The pin (not shown) referred to earlier for locating the oil seals 12 to the port plate 7 may be extended to also angularly locate the cam of the pump and the end plate 13 to one of the fins 14 or to the body of the heat sink 16.

Radially outside of the heat sink 16 is the stator 20 of the electric motor. The stator 20 is mounted on an outer wall of a first part of the heat sink 16. The windings 21 of the motor, which are usually of copper, are wound onto the stator 20. The stator 20 forms a tight interference fit to the outer wall of the first part of the heat sink 16. Thus, good thermal contact is established between the copper wound stator and the heat sink 16. The thermal connection between the stator 20 and the heat sink 16 may also be provided by a thermally conductive material between the stator 20 and the heat sink 16. The windings 21 are connected to a control circuit device 22 which is mounted on the end of the heat sink 16 distant from the cover member 2. The windings 21 are protected from the pump housing or heat sink 16 by means of an electrically insulating ring member 21a.

Figure 5:
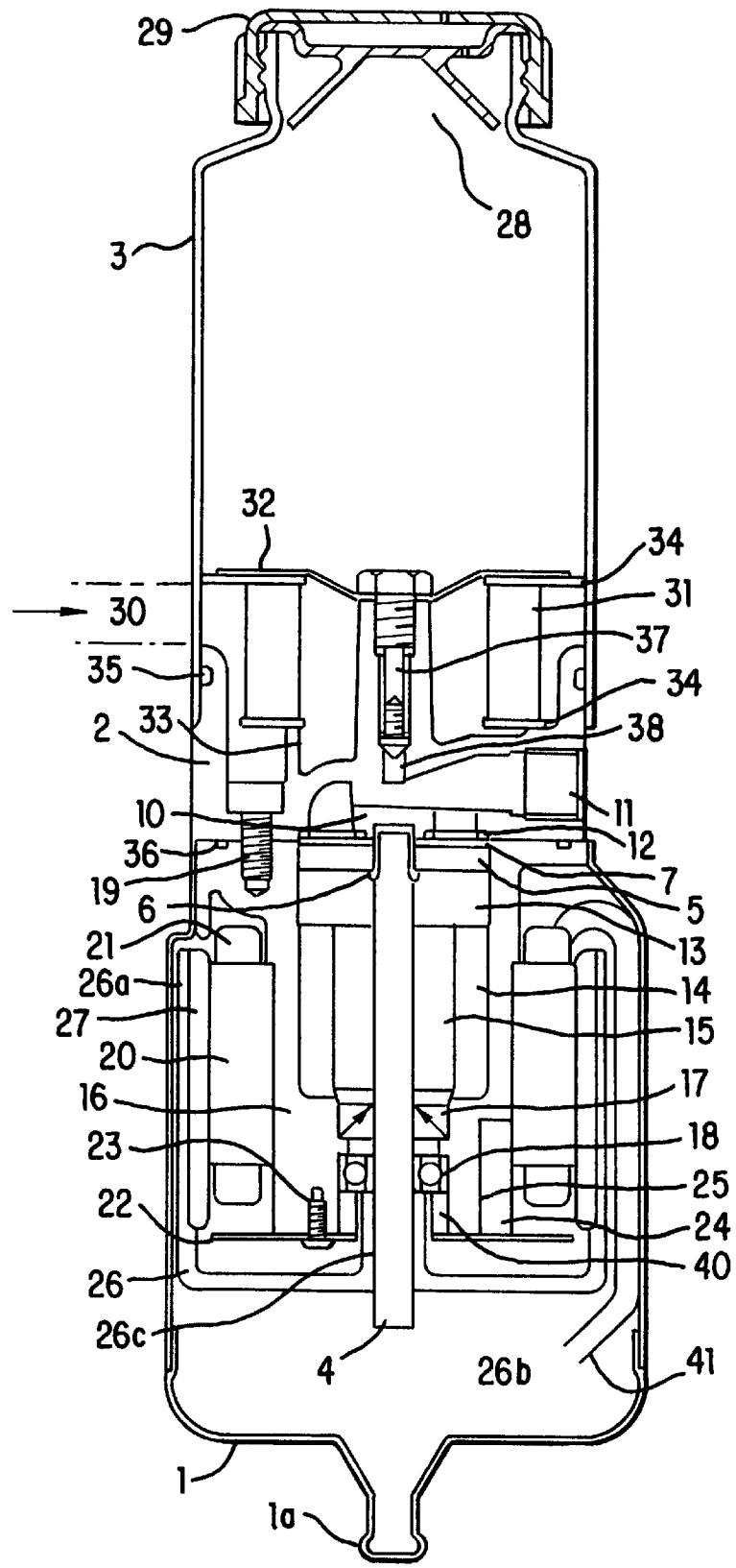
FIG. 5 is a first axial sectional view through an integral rotary pump and motor in accordance with a second embodiment of the present invention.

The control circuitry 22 is provided on a printed circuit board (pcb) which is secured to the heat sink or pump housing 16 by means of one or more screws 23 or other conventional securing devices. One or more FETs 24 form part of the control circuitry 22. In FIG. 1 the FETs 24 are mounted on the lower side of the pcb and are arranged to be in thermal contact with the heat sink 16 by means of a thermal bridge member 22a which may consist of anodised-aluminium so that it also functions as an electrical insulator. Alternatively, as shown in FIG. 5, the FETS may be located in grooves or channels 25 in the heat sink 16. Either eight or four FETs 24 are provided with the rotary pump and motor shown in the accompanying figures, although only two are shown. The FETs 24 are positioned circumferentially about the heat sink 16.

Figure 6:
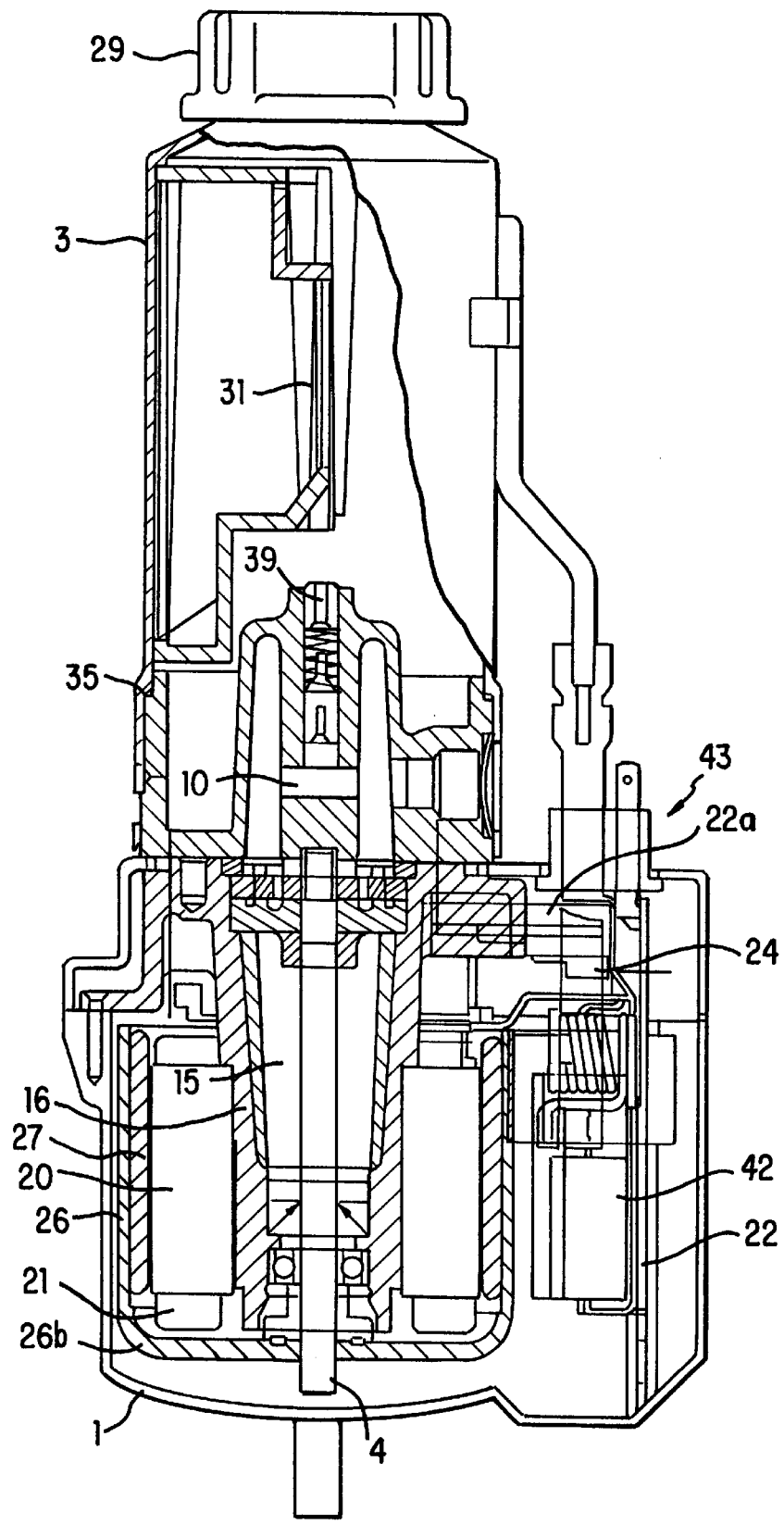
FIG. 6 is an axial sectional view through an integral rotary pump and motor in accordance with a third embodiment of the present invention.

In the case of FIG. 6 the control circuitry on the pcb 22 is located in a slot in the wall of the casing 1. The FETs 24 in this embodiment are secured to a thermal bridge 22a which is in contact with the pump housing 16. Thus, as may be seen in FIG. 6, the control circuitry including the FETs is positioned radially outside of the motor and so avoids the overall axial length of the integral pump and motor being increased.

Radially outside of the stator 20 is provided the rotor 26 thereby forming a brushless motor. The rotor 26 has an axially extending wall 26a to which the magnets 27 are secured by any suitable adhesive material such as a cement mixture. The arrangement of the magnets 27 is conventional in the form of alternate segments of magnets having different poles. Conventionally 14 segments are employed. At one end of the axially extending wall 26a of the rotor 26 there is provided a radially extending member 26b which connects the axially extending wall 26a to the shaft 4. At the end of the radially extending member 26b adjacent the shaft 4 an aperture through which the shaft 4 passes is defined by a shaft engaging wall 26c. The shaft 4 is held by the shaft engaging wall 26c in a press fit. A bearing retainer or collar 40 may also be provided.

Figure 2:
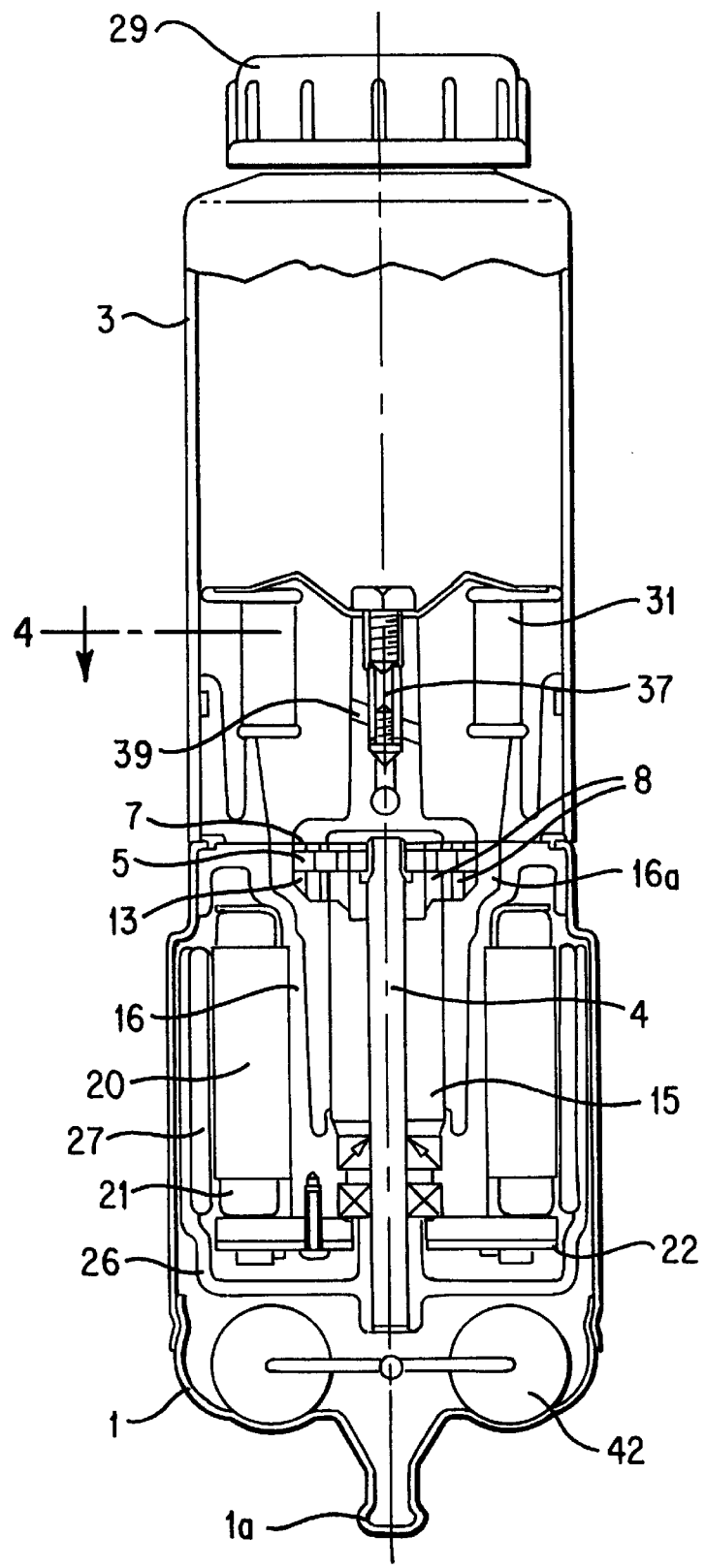
FIG. 2 is a second axial section view through the integral rotary pump and motor of FIG. 1.
Figure 4:
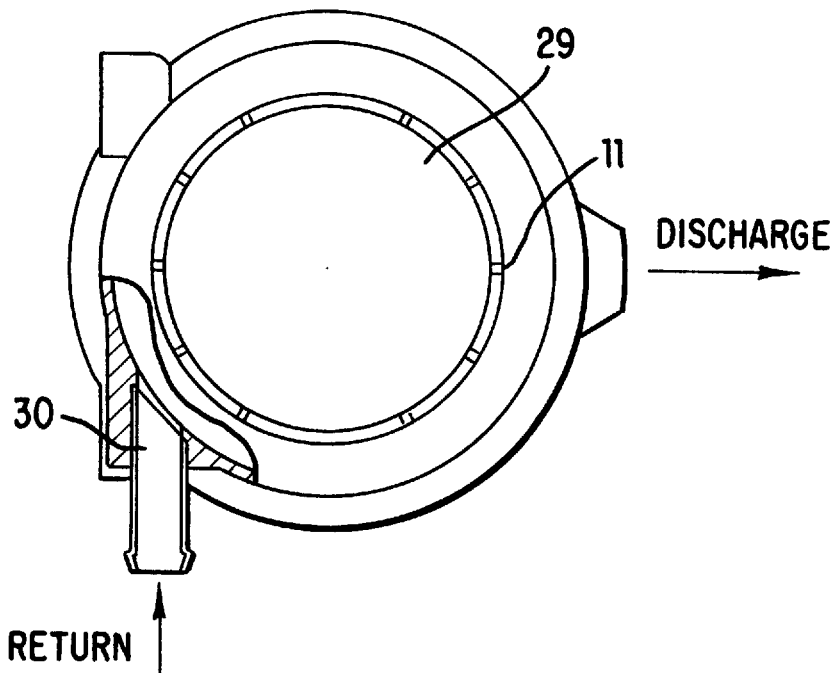
FIG. 4 is a plan view from above cut-away along the line B- in FIG. 2.

As shown in FIGS. 1 and 2, the space axially outside of the rotor 26 but within the casing 1 can be used to hold additional control components for example filter capacitors 42 for use in the suppression of power spikes. The power leads 41 are shown extending from the stator 20 around the outside of the rotor 26 to the filter capacitors 42. An internal cable shield 44 prevents contact of the leads 41 with the rotor 26. The capacitors 42 are connected in parallel between the positive and negative power connections 43 which also provides the control input.

In FIG. 6, it will be seen that the filter capacitors 42 and additional control components are positioned with the pcb 22 radially outside of the motor. The electrical connections 43 are similarly provided on the casing distant from the rotor 26.

With reference to the upper portion of FIGS. 1, 2, 5 and 6, the cover member 2 and oil reservoir 3 is generally conventional in design. The reservoir 3 is arranged to hold ½ liter of oil. A closable aperture 28 is provided at one end of the reservoir 3 to enable oil to be removed and added. A screw threaded lid member 29 is shown in FIG. 1. The reservoir 3 also includes a vent 29a to accommodate oil volume or fluid level variations. An oil return port 30, marked in FIG. 1 in dotted lines, provides the inlet port for oil returning from the steering system. The returning oil then passes through a ring filter 31 which is secured at one end to a sprung plate 32 which acts as a pressure limiter. The sprung plate 32, which is in the form of fingers to permit oil from the main body of the reservoir 3 to feed to the pump, is arranged to raise the filter 31 from its position against a projecting wall 33 of the cover member 2 in the event the filter 31 becomes blocked. In this way oil entering the return port 30 may pass downstream of the filter 31 in the event, for example, a pressure in excess of ½ bar develops upstream of the filter 31. The filter 31 may be conventional in design consisting of a paper element secured at each end to steel or rubber end caps 34. Alternatively, the filter 31 may be constructed from nylon mesh.

The oil reservoir 3 is connected to the cover member 2 through at least one O-ring 35. The reservoir 3 is secured to the cover member 2 by means of a snap fit over lugs 2b formed on the periphery of the outer wall of the cover member 2. A similar O-ring 36 is located in a groove in the face of the heat sink 16 which abuts against the cover member 2.

Pressure relief valve means 37 is provided to bring the high pressure discharge conduit 10 in communication with the low pressure inlet gallery 16a, when the pressure of the oil emerging from the high pressure ports 9 exceeds a predetermined value. The inlet 38 to the pressure relief valve 37 therefore communicates with the high pressure conduit 10 and the pressure relief outlets 39 communicate with the oil reservoir 3.

In FIG. 1 the high pressure ports 9 and the high pressure discharge outlet 11 is shown. In FIG. 2, on the other hand, the communication of the oil cavity 15 with the low pressure ports 8 is shown. The low pressure galleries 16a are shown and, as may be clearly seen, the galleries 16a are defined by the wall of the heat sink or pump housing 16 and the rotary pump assembly. The inlet galleries 16a provide the fluid connection between the reservoir 3 and the cavity 15.

It will be appreciated that unlike conventional motors used with rotary pumps, the rotor 26 is positioned and rotates on the outside of the stator 20. Moreover, at least part of the pump housing is located between the shaft and the rotor 26. This arrangement provides a number of significant advantages over conventional arrangements of rotary pumps and motors. Firstly, the stator 20 of the motor is in thermal contact with the heat sink 16 which is, in turn, in thermal contact with oil in the cavity 15. Heat generated from the stator 20 is therefore transferred to the oil which is then pumped around the steering system where it is cooled. Similarly the FETs 24 are also in thermal contact with the heat sink so that the heat generated may be transferred to the oil. This significantly reduces the temperature of the casing 1 thereby enabling the rotary pump and motor to be used under the bonnet of a vehicle safely and more significantly maintains the internal components below a temperature which could cause failure.

Also, because the rotor 26 is on the outside of the motor it is larger than conventional rotors and enables the rotor magnets to be made of a ferrite material rather than a rare earth for a given power.

In the case of FIGS. 1 to 5, the fact that the control circuitry 22 is within the enclosed space of the rotor 26 protects the control circuitry 22 from damage and also provides electrical and magnetic shielding of the control circuitry. The casing 1 provides additional shielding. It also allows for a single control/power connection to the outside of the casing 1, as desired. In the embodiment of FIG. 6, the control pcb 22 is mounted externally of the rotor 26 but still within the motor casing 1. This too enables the pump and motor to be built and tested as a discrete power unit.

As may be seen clearly in the Figures, the arrangement described also enables the rotary pump to be positioned at least partially and ideally wholly within the axial and radial dimensions of the motor. This results in a significantly smaller pump and motor unit in which the pump is integral with the motor by means of the heat sink 16. This also enables the pump and motor to be manufactured as an integral unit requiring one set of tests rather than individually testing the pump and motor separately.

It will be appreciated that the pump assembly need not consist of a pumping device in the form of vanes with a rotating carrier and associated cam member. Alternatively, the pumping device could consist of two or more gears or a piston with a swash plate or cam mounted on the rotatable shaft.

Alternative arrangements and functionally equivalent components are envisaged whilst remaining within the spirit and scope of the present invention claimed in the accompanying claims.

We claim:

1. A rotary pump assembly having at least one inlet port, at least one outlet port, a housing and a pumping device in fluid communication with the inlet and outlet ports, the pumping device including a pump driver member mounted on a rotatable shaft which is connected to a rotor that is part of an electric motor, a portion of the housing being located radially between the shaft and the rotor of the motor and having the stator of the motor mounted thereon, wherein circuitry for controlling operation of the electric motor is mounted on the housing radially between the shaft and the rotor of the electric motor.

2. A rotary pump assembly as claimed in claim 1, wherein the stator is mounted on an outer surface of the housing.

3. A rotary pump assembly as claimed in claim 1, wherein the housing is a heat sink.

4. A rotary pump assembly as claimed in claim 3, wherein a thermally conductive material is provided between the stator and the outer surface of the housing.

5. A rotary pump assembly as claimed in claim 1, wherein a fluid cavity connecting a fluid supply to at least one inlet port is provided within the housing.

6. A rotary pump assembly as claimed in claim 5, wherein the fluid cavity is defined by a portion of the outer surface of the shaft and an inner wall of the housing.

7. A rotary pump assembly as claimed in claim 1, wherein a fluid cavity connecting a fluid supply to at least one inlet port is provided within the housing and wherein the housing includes an inner wall having thermally conductive fins.

8. A rotary pump assembly as claimed in claim 1, wherein a fluid cavity connecting a fluid supply to at least one inlet port is provided within the housing and the fluid cavity is wholly located radially between the shaft and the rotor of the electric motor.

9. A rotary pump assembly as claimed in claim 1, wherein circuitry for controlling operation of the electric motor is mounted on the housing radially between the shaft and the rotor of the electric motor.

10. A rotary pump assembly as claimed in claim 9, wherein the housing is a heat sink and at least one of the components of the circuitry is in thermal contact with the housing.

11. A rotary pump assembly as claimed in claim 1, wherein the rotor of the electric motor includes an axially extending magnetic part and a radially extending part which connects the axially extending magnetic part to the shaft and circuitry for controlling operation of the electric motor is mounted on the housing and is located with the space defined by the shaft, the radially extending part and the axially extending part of the rotor.

12. A rotary pump assembly as claimed in claim 1, wherein the pump is an operational part of the electric motor.

13. A rotary pump assembly as claimed in claim 1 arranged for use in a vehicle power steering system.

14. A rotary pump assembly having at least one inlet port, at least one outlet port, a housing and a pumping device in fluid communication with the inlet and outlet ports, the pumping device including a pump driver member mounted on a rotatable shaft which is connected to a rotor that is part of an electric motor, a portion of the housing being located radially between the shaft and the rotor of the motor and having the stator of the motor mounted thereon, wherein a fluid cavity connecting a fluid supply to at least one inlet port is provided within the housing and the fluid cavity is wholly located radially between the shaft and the rotor of the electric motor.

15. A rotary pump assembly having at least one inlet port, at least one outlet port, a housing and a pumping device in fluid communication with the inlet and outlet ports, the pumping device including a pump driver member mounted on a rotatable shaft which is connected to a rotor that is part of an electric motor, a portion of the housing being located radially between the shaft and the rotor of the motor and having the stator of the motor mounted thereon, wherein the rotor of the electric motor includes an axially extending magnetic part and a radially extending part which connects the axially extending magnetic part to the shaft and circuitry for controlling operation of the electric motor is mounted on the housing and is located with the space defined by the shaft, the radially extending part and the axially extending part of the rotor.

* * * * *